July 16, 1963

C. A. GURROLA ETAL 3,097,562

METHOD FOR PHOTOGRAPHICALLY CORRELATING
A PLURALITY OF SEISMOGRAMS

Filed May 15, 1959

Charles A. Gurrola
Gary C. Elliott
INVENTORS

BY Hayden + Pravel

ATTORNEYS

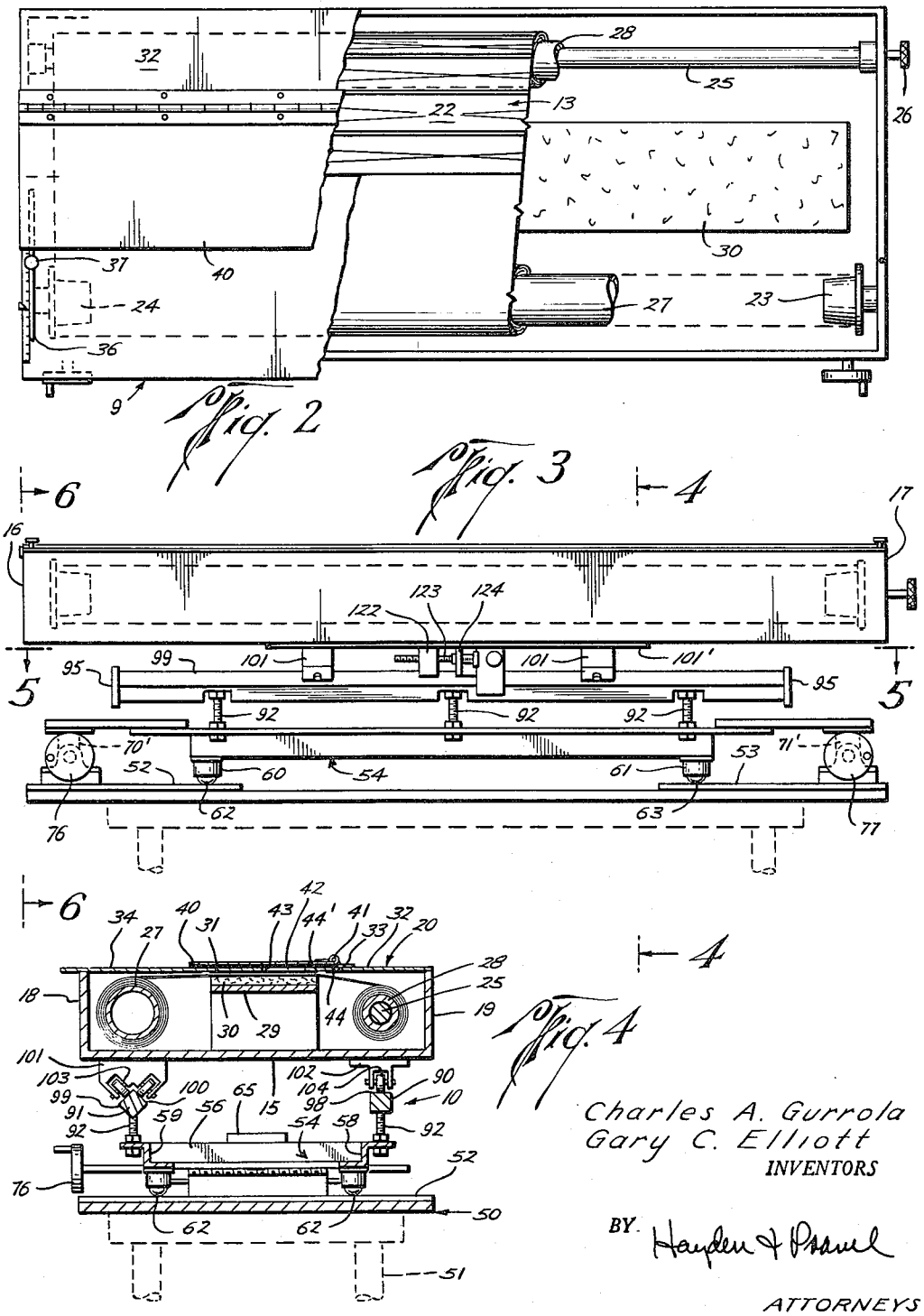

July 16, 1963

C. A. GURROLA ETAL 3,097,562

METHOD FOR PHOTOGRAPHICALLY CORRELATING
A PLURALITY OF SEISMOGRAMS

Filed May 15, 1959

Charles A. Gurrola
Gary C. Elliott
INVENTORS

BY Hayden & Prawl

ATTORNEYS

United States Patent Office 3,097,562
Patented July 16, 1963

3,097,562
METHOD FOR PHOTOGRAPHICALLY CORRELATING A PLURALITY OF SEISMOGRAMS
Charles A. Gurrola and Gary C. Elliott, both of 301 M & M Bldg., Houston, Tex.
Filed May 15, 1959, Ser. No. 813,519
4 Claims. (Cl. 88—24)

The present invention is directed to a method for forming a record representing a sectional view of a portion of the earth's subsurface.

At the present time in seismograph work, seismograms, or seismograph records are obtained by detonating a charge so as to send sound waves into the earth. Geophones are arranged so as to pick up and record the resulting sound waves thus created. The seismogram from each shot point is correlated with the other seismograms obtained from other shot points in the area to interpret and study the subsurface structure of the earth for indication of mineral deposits and more particularly petroleum deposits of oil and gas.

Generally, the seismograms from each shot point are approximately 8″ wide and are anywhere from four feet to ten feet long and it can be appreciated that in order to make an analysis of a portion of the earth's subsurface, it is desirable to arrange each seismogram in order in relation to the shot points at which the seismograms were obtained, and in side by side relation to each other to form a view representing a section of the earth's subsurface.

The problem is additionally complicated by reason of certain time lags from the time of detonation to a reference point or mark on each seismogram designated as "zero time." It can be appreciated that in those situations where it is desired to correlate all of the various seismograms in a given area in order to obtain a representation of the subsurface structure of the earth, it is desirable to relate each of the seismograms to the "zero time" reference line which is indicated on each seismogram, and it is desirable to arrange as many of the seismograms in side by side relation as possible so as to try to obtain an overall impression or understanding of the records.

Because of the size of the records it is extremely difficult to arrange the seismograms so that they may be easily used. Also, because of the possible time differential in each seismogram, that is in view of the possible variation from the time of detonation to the "zero time" it is extremely difficult to arrange the seismograms in relation to each other so that all of them are related to each other properly corresponding to their "zero time" reference mark or point.

Furthermore, various records may originally vary in intensity and may deteriorate in intensity and color over a period of time so that it is extremely difficult if not impossible to reproduce them by present methods and apparatus to form a sectional view of the earth's surface which is substantially uniform in intensity and color.

The present invention provides a method whereby a single record may be formed representing a sectional view of a portion of the earth's subsurface, which method overcomes the above named and other problems presently involved in trying to provide such record.

An object of the present invention is to provide a method of holding photosensitive, or light sensitive paper, and support means for the holding means whereby the holding means may be adjusted relative to an enlarger so that a plurality of seismogram images may be stepwise projected from the enlarger onto the photosensitive material in order to provide a record representing a sectional view of the earth's subsurface.

Still another object of the present invention is to provide a method of representing an area of the subsurface of the earth by relating a plurality of seismograms to a reference mark on each of the seismograms, and thereafter relating the seismograms by said reference mark to each other by projecting the image of each of said seismograms onto a sheet of photosensitive material so that the seismograms are placed in side by side position in relation to the reference mark thereon whereby a sectional view representing an area of the earth's subsurface is provided.

Still another object of the present invention is to provide a method utilizing an adjusting mechanism for holding a roll of photosensitive material whereby the material may be adjusted in relation to an enlarger positioned thereabove, so that a plurality of images on a film in the enlarger may be projected stepwise onto the photosensitive material, the plurality of images each having a reference mark thereon which reference mark is placed on the device holding the photosensitive material when the first image is projected thereon, and each successive image being positioned on the photosensitive paper in relation to the first reference mark.

Yet a further object of the present invention is to provide a method of supporting a roll of photosensitive material in relation to an enlarger, which method includes adjusting the roll of photosensitive material relative to the camera so that the image projected from the camera may be positioned on the roll in a desired manner.

Another object of the present invention is to provide a method of forming a record of substantial uniform intensity from a plurality of individual records of varying intensity.

Still a further object of the present invention is to provide a method whereby a plurality of records may be stepwise correlated to each other and stepwise projected onto and recorded on photosensitive material in side by side position and in relation to a predetermined correlation so as to provide a composite of all of the individual records.

Still another object of the present invention is to provide a method of holding a continuous roll of photosensitive material, which is arranged so as to stepwise expose a portion of the photosensitive material so that a plurality of records may be placed thereon in a predetermined relation to provide a record which is a composite view of all of the records.

Other objects and advantages of the present invention will become more readily apparent from consideration of the following description and drawing wherein:

FIG. 2 is a top view of the housing which holds the photosensitive material, which view is partially broken away to illustrate in greater detail the manner of supporting the photosensitive material in the housing;

FIG. 3 is a front side view illustrating the preferred embodiment of the apparatus shown in FIG. 2, and showing the manner of supporting the housing for movement whereby the photosensitive material carried thereby may be positioned relative to a projector projecting an image onto the photosensitive material in a predetermined manner;

FIG. 4 is a sectional view on the line 4—4 of FIG. 3 and illustrates further structural details of the housing and the support mechanism therefor;

As stated previously, the present invention has particular utility in forming a record which illustrates a sectional view of the earth's subsurface. Seismograms or seismograph records are obtained by means well known in the art, and the present invention provides a method whereby a plurality of seismograph records may be related to each other and placed in a form so that they can be studied intelligently.

Generally, seismograms are hand developed in the field when they are made, such records may, for this reason and others, originally vary in tone and shade.

The present invention not only provides a method of relating a plurality of records, but it also provides a method whereby a plurality of records which vary in intensity may be formed into a single record having more uniform intensity than heretofore possible by other methods.

The present invention is described in detail in its application to seismogram records, but it can be used in any desired situation on any type of records, and the present description of its use in connection with seismograms is for purposes of illustration only.

Figure 1:
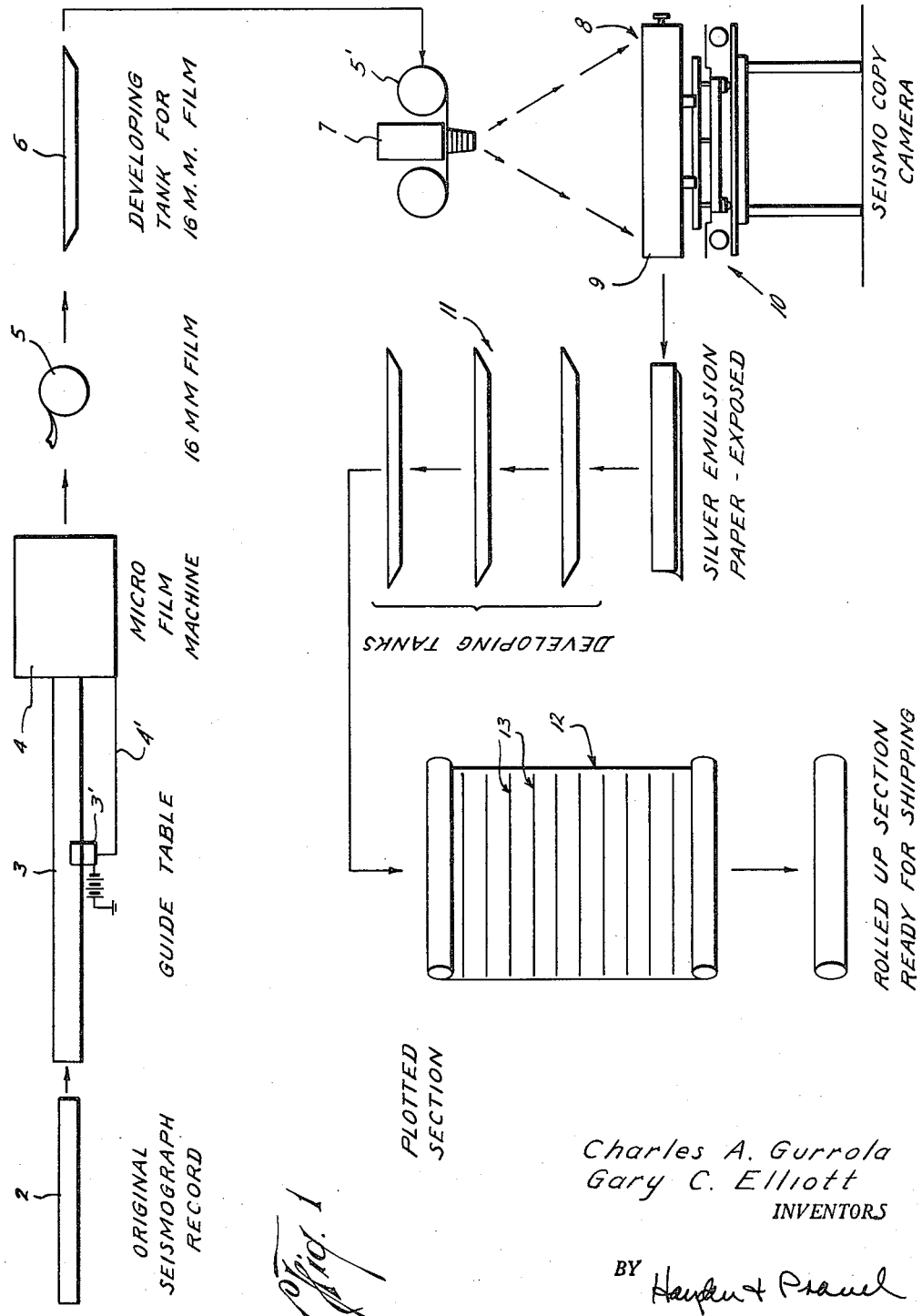
FIG. 1 is a schematic line drawing illustrating the flow sheet of the preferred method of practicing the present invention.

In FIG. 1, an original seismograph record is represented by the numeral 2. Generally, such seismograph records approximate 8" in width and may be anywhere from four to ten feet in length. It can be appreciated that a great deal of difficulty is encountered in trying to correlate a plurality of such records because of their physical size. Also, it is necessary to relate all of the records to a common reference line so that the markings on the records may be correlated. Because of problems encountered during setting off the charge and in recording of the sound waves resulting therefrom, corrections must be introduced into the records in a manner well known in the art.

The present invention provides a method whereby the records with such corrections thereon may be placed in a form so that they can be intelligently studied and evaluated more readily than heretofore possible. Specifically, the invention deals with a method which enables a plurality of seismograms to be correlated to each other to properly represent a sectional view of the earth's subsurface and which places the seismograms in a record form so that they can be more easily used.

The seismograph records or other type of record when desired, one of which is illustrated at 2 are first positioned on a guide table as illustrated at 3 and then they are individually and in sequence conducted to a micro-camera 4 which makes a micro-photograph of all of the micrograms. Prior to the time that the first one of the seismograph records 2 is conducted to the micro-camera a reference mark is placed thereon in relation to a time correction, which correction and the manner of determining is well known to any person skilled in the seismograph field.

Thereafter, each seismograph record is marked in relation to this reference mark on the first seismograph. Therefore, when the seismograph records are individually and stepwise photographed by the micro-camera, this reference mark on the first seismograph record, as well as the reference mark on all subsequent seismograph records of the area of the earth which they represent incorporate therein the reference mark above referred to.

A light sensitive device, such as a light meter is shown at 3' and when positioned over the record 2 on the table 3 will record the light intensity reflected therefrom. This will measure the shade or color of the record 2 which in turn will control the exposure of each record by the camera 4.

The light meter 3' is connected to a source of electricity and is electrically connected at 4' to the camera 4 and the measurement by 3' will either decrease or increase the amount of light in camera 4 as each record 2 is exposed therein. For example, a good black and white record of proper tone and color well known to any person skilled in using such records may be used to calibrate light meter 3' and the electrical switch (such as a resistance) in camera 4. Thereafter, as other records 2 are positioned so as to reflect light therefrom on to meter 3', the meter 3' through electrical connection 4' will either turn on additional lamps, or cut off lamps in camera 4 to either increase or decrease the exposure of each record.

For example, if a faded, yellow record is to be filmed by camera 4, then when a record of this description is subjected to light meter 3', the electrical switch in camera 4 will be actuated to turn on more lights in the camera and thereby increase the exposure of the weak discolored record to try to make it approach the intensity of the record by which light meter 3' and camera 4 were calibrated. Each record is thereby subjected to its individual exposure time as required by its condition to try to provide a film of nearly uniform intensity of each record.

The micro-film obtained by using camera 4 is illustrated at 5, and of course the film is thereafter developed in a developing medium as illustrated at 6 in a means well known in the art.

The micro-film is then placed in an enlarging projector 7 so that the images of the individual seismograms or seismograph records may be focused on the apparatus designed generally by the numeral 8 and referred to as the seismocopy camera. The seismocopy camera includes a housing 9 for supporting photosensitive material therein whereby the individual images of the seismograph records from the negative of the micro-film 5' may be focused on the photosensitive or light sensitive material in the housing 9 and in a predetermined manner as will be described in greater detail hereinafter. The housing 9 is provided with a support means whereby the housing 9 may be moved relative to the enlarging projector 7, such support means being designated generally by the numeral 10.

Not all variations in color or intensity between the individual records will be eliminated in the camera 4. Therefore, when the film 6 is projected by the enlarger 7, the time of exposure of each record on such film may be varied to endeavor to further eliminate any color variations of the records as compared to the "standard," or the good non-discolored black on white by which the camera 4 and light meter 3' were calibrated.

Figure 6:
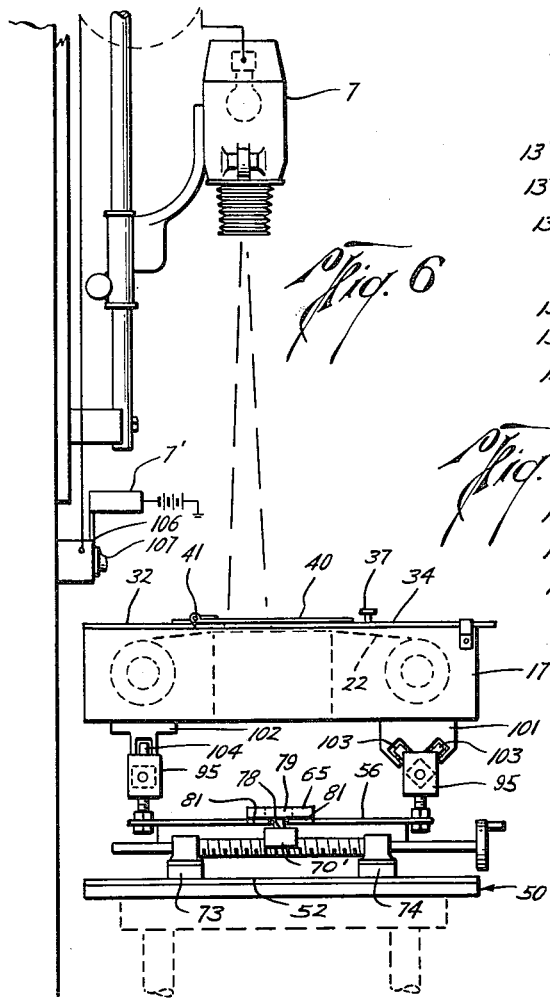
FIG. 6 is an end view of the apparatus illustrated in FIGS. 2-5 inclusive and shows a projector positioned thereabove whereby an image may be projected onto the photosensitive material when desired.

This is accomplished by means of the light meter illustrated at 7' in FIG. 6 as the image of each record is stepwise projected on the top of aperture cover 40, as described hereinafter, a certain amount of light, depending upon how dark or light the negative in the film 6 of each record, will be reflected against light meter 7'. Light meter 7' is connected to a source of electrical energy and is electrically connected to timer 106. The timer 106 is of a type which is electrically controlled so that the amount of exposure time of the enlarger, will be automatically controlled by the timer 106 which is electrically connected to light meter 7' and to enlarger 7. The light meter 7' electrically sets the timer 106 depending upon the reaction to the reflected light from each image on the film 5.

Thereafter when aperture cover 40 is opened and an exposure is ready to be made on the photosensitive paper in housing 9, button 107 of timer 106 is punched and the timer 106 actuates the light source in enlarger 7 to project an image of the record at the prescribed time.

The light meter 7' and timer 106 will be calibrated by the same "standard," or the same record by which light meter 3' and camera 4 are calibrated. Therefore, each record image which is stepwise projected from enlarger 7 will be correlated to the standard desired.

After the images of the seismograph records have been exposed on the photosensitive material in the housing 9 the photosensitive material is thereafter placed in the developing tank and developed in a manner well known in the art. The developing tank is designated generally by the numeral 11. We have found that silver emulsion paper, of the type commonly found on the market serves the purpose quite well as the photosensitive material for use in the present invention.

Figure 7:
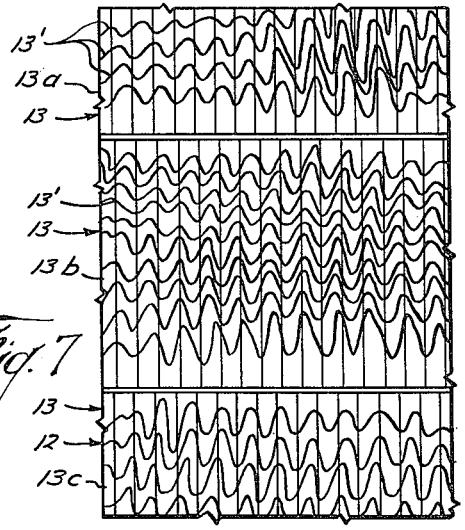
FIG. 7 illustrates a portion of the record obtained by the method of the present invention.

The finished product or record is illustrated generally at 12 in FIG. 1 and shows by schematic line drawing 13 one of the seismograph records. The other seismograph records are also represented by the lines designated by the numeral 13 and are shown as being in side by side relation to each other. In FIG. 7, a part of the record 12 is shown in greater detail, as is each of the seismograms represented by the numeral 13 in FIG. 1. FIG. 7 more accurately represents the record 12 and the seismograms 13 which form the record. Each seismogram 13 consists of a plurality of lines 13'; each line 13' is the recording of a sound wave obtained from a geophone when a detonation is set off at a shot point. A plurality of geophones may be arranged at each shot point and therefore the seismogram of any shot point will have the same number of lines 13' corresponding to the number of recordings from geophones.

The number of geophones used may vary from shot point to shot point, and this is illustrated in FIG. 7 wherein a portion of the record 12 is shown. For example, the seismogram 13a is the record of the sound waves at one shot point or detonation point which was recorded by four separate geophones and thus there are four lines designated 13'. The sound waves from the next shot point in sequence are recorded on seismograms 13b and it will be noted that there are ten lines on this seismogram, one for each geophone at the shot point represented by seismogram 13b. Seismogram 13c shows that there were four geophones recording at the shot point represented by seismogram 13c.

From FIG. 7, it can be seen that the seismograms from all of the shot points in a given area are in sequence placed in side by side relation by the method of the present invention so that the sound waves from the various shot points can all be correlated and studied.

Since the individual seismograms are all recorded on one piece of paper, they will not shift about, or become displaced in relation to each other which is the case when the individual seismograms are laid out side by side on a table as heretofore done.

Also, the size of the record 12 may be such that it can conveniently be placed on a table, and the record 12 may be made in any desired size since the enlarger 7 can enlarge the micro-film 5' as desired.

The adjusting means or mechanism 10 which supports the housing 9 enables the housing to be manipulated relative to the enlarger 7 so that each seismograph record is positioned on the photosensitive paper in relation to the original reference mark placed on the first seismograph record, and of course, subsequently each seismograph record is similarly positioned on the photosensitive material.

The seismograph records which were originally separate strips of paper from eight inches in width and varying from four to ten feet in length are provided in the record form 12 in a size of approximately 48 inches. Since the records are in side by side relation to each other in a predetermined manner, they represent a sectional view of the subsurface of the earth. Thus, the sections may be viewed as a composite so that they may be more intelligently compared with each other and conclusions drawn therefrom.

In FIG. 2 the housing is shown at 9. The housing is a closed box by reason of the continuous bottom 15, end 16, end 17, front and back sides 18 and 19 respectively all connected together as shown in the drawings. A top designated generally by 20, the structural details of which will be discussed hereinafter, closes off the top of the housing 9 so that the housing 9 forms a closure for holding the photosensitive material or paper in unexposed position until desired.

The roll of photosensitive material is illustrated at 22 in FIG. 2 and comes in various standard lengths and widths. The width used in the present invention will be such that the roll will fit within the housing 9. A pair of rotatable support members as shown at 23 and 24 are provided for supporting the roll of photosensitive material in position in the housing 9. A rod 25 is adapted to carry the reel 28 on which reel is received the other end of the material. The rod and connected reel are provided with suitable means such as the knob 26 whereby the photosensitive material 22 may be unrolled from the reel 27 on which it is originally supported onto the reel 28 which is supported on the rod 25 as the material is exposed.

A plate 29 is mounted longitudinally in the housing 9 and spaced below the top 20 and is provided with a black felt covering 30 whereby as the photosensitive material is displaced from the roll 27 onto the reel 28 such material passes over the top of the black felt as illustrated at 31.

The top 20 of housing 9 is formed by reason of the plate 32 which is secured along the top edges of the ends 16 and 17 and back side 19 of the housing 9 and terminates along the line 33. A second plate 34 is slidably supported on the top edges of the end panels 16 and 17 and the front panel 18. In order to hold the plate 34 in position on the top edges a slot 36 is provided along each edge of the plate, in which slot the screw 37 fits and is adapted to engage in the top of edges 16 and 17 so that when the screw 37 is rotated to tighten it, it abuts the top surface of the plate 34 and holds the plate 34 in any predetermined position along the top edges of the end surfaces 16 and 17 and the front surface 18. This spaces the plate 34 relative to plate 32 to form the aperture 42 in the top 20. A cover plate 40 is hingedly mounted as illustrated at 41 adjacent the termination 33 of the plate 32, and extends over the plate 34. Such plate 40 acts as a cover for the aperture 42 formed between the termination 43 of the plate 34 and the termination 33 of the plate 32. In order to inhibit the entry of undesired light onto the photosensitive material 22 a strip of felting 44 may be positioned adjacent the termination 33 and an additional strip 44' secured to the nether side of the aperture cover 40 as shown in FIG. 4 of the drawing so that when the aperture cover 40 is closed the strip 44' will abut the felt strip 44 thereby tending to close off any light which might otherwise pass through the hinge connection 41.

The aperture 42 extends longitudinally of the housing 9 as noted in the drawings and provides a means whereby only a portion of the photosensitive material 22 is exposed without exposing the remainder.

Since each of the seismograms or seismograph records are provided with a reference mark, and since the reference mark on each seismogram or seismograph record must be related to the mark on adjacent seismograms, it is necessary that the housing 9 be movably supported so that the aperture may be arranged so as to receive and align the image from the enlarger 7 of FIG. 1. The adjusting means for the housing 9 is illustrated generally by the numeral 10 and is shown in greater detail in FIGS. 3, 4 and 5.

The means 10 supports the housing 9 so that it can be moved or adjusted and positioned relative to the enlarger 7 so as to receive the image projected therefrom onto the roll of sensitive material carried by the housing 9 in proper relation to the other images previously recorded in continuous roll 22. To this end a platform 50 is supported on any suitable means such as legs 51 whereby the platform 50 is positioned in a desired elevated manner. The platform 50 is of course longer than it is wider as can be seen from FIG. 5 and provides surfaces of 52 and 53 which are substantially horizontal and provide surfaces upon which the table designated generally at 54 supported thereon may be moved. The table 54 includes the rectangular frame designated generally at 55 in FIG. 5 which includes the end members 56 and 57 that are joined together by the side members 58 and 59 to form an integral frame. Depending downwardly from each of the end members 56 and 57 are paired roller housings 60 and 61 which support and carry the paired rollers 62 and 63 respectively whereby the table 54 is movably supported on the surfaces 52 and 53 of the platform 50.

Secured to and extending from each end piece 56 and 57 are the tongues 65 and 66. Each tongue extends from its connection with the respective end members 56 and 57 as more clearly illustrated in FIG. 5 of the drawings. A threaded shaft 70 and 71 is provided adjacent each end of the platform 50 and as more clearly illustrated in FIGS. 3 and 5 of the drawings, each shaft 70 and 71 is rotatably supported by the means designated at 73 and 74. The means 73 and 74 thereby support the shafts 70 and 71 in elevated position relative to the surfaces of 52 and 53 of the platform 50. Cranks 76 and 77 are connected to each of the shafts 70 and 71 whereby they may be rotated about their longitudinal axis. The threaded shafts 70 and 71 are adapted to engage with the threaded members 70′ and 71′ which members 70′ and 71′ may be formed by cutting a threaded nut in half.

A pin 78 is connected to the member 70′ and extends upwardly therefrom and a pin 78′ is connected to the member 71′ and extends upwardly therefrom. The pin 78 has an enlarged head 79 thereon as shown more clearly in FIG. 6 which is adapted to ride or fit slidably in the groove or slot 80 formed in the tongue 65. The slot 80 is provided with plates 81 on the nether side thereof as shown in FIG. 6, which plates may be secured to the tongue 65 by any suitable means such as screws or the like and provide a reduced opening in the tongue 65 through which pin 78 fits. The plates slidably support the head 79 of the pin 78.

Figure 5:
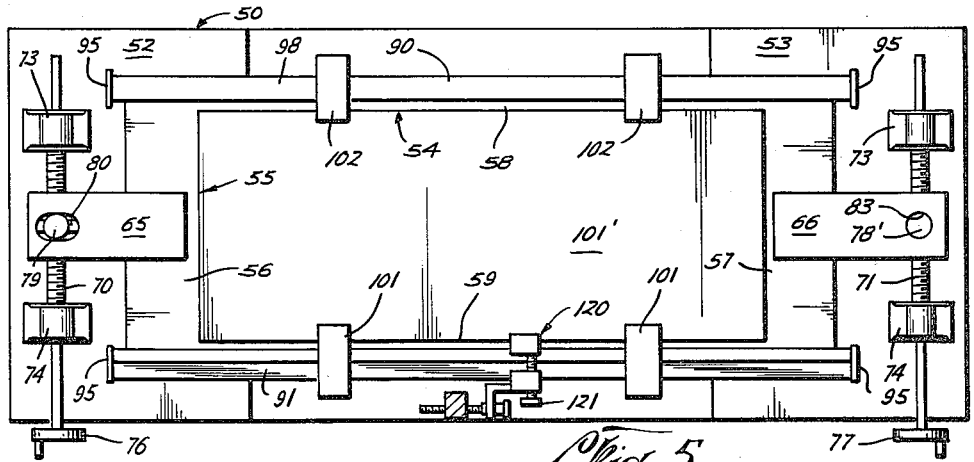
FIG. 5 is a view on the line 5—5 of FIG. 3 and showing further structural details of the supporting mechanism for the housing which encloses the photosensitive material.

The pin 78′ on the member 71′ fits within the opening 83 in the tongue 66 as shown in FIG. 5. From the foregoing description, it can be appreciated that when the crank means 76 and 77 on the shafts 70 and 71 are rotated, the table 54 is moved laterally relative to the elongated platform 50. Such movement is also accommodated by reason of the spaced rollers 62 and 63 on each end of the platform, which rollers move along the surfaces 52 and 53 of the platform as can be viewed in FIGS. 3, 4 and 5 of the drawings. The arrangement of the pins 78 and 78′ in the tongue members 65 and 66 also permit the table 54 to be moved at either end independently of the other end so that the table can be skewed relative to the platform 50 if desired.

Guide rails 90 and 91 are carried by the table means 54, and such guide rails are secured to the table by any suitable means such as the members 92 which are fixed in each of the side members 58 and 59 at spaced intervals therealong as shown in FIGS. 3 and 4 of the drawings. Suitable stops 95 may be provided on each end of the guide rails to act as a stop for limiting travel along each of the guide rails 90 and 91. It will be noted that the guide rail 90 presents substantially a horizontal surface 98 on the upper side thereof for receiving a member thereon, whereas the guide rail 91 is positioned so that two surfaces 99 and 100 are positioned for receiving rollers thereon. This is more clearly illustrated in FIGS. 5 and 6 of the drawings wherein it will be noted that the housing 9 has secured to the nether side thereof the plate 101′ on which the support means 101 and 102 is mounted. The supports 101 and 102 carry the rollers illustrated at 103 and 104 respectively for rolling along the surfaces on the guide rails 90 and 91.

It will be noted that the rollers in the support 101 are positioned at an angle so as to roll on or move along each of the surfaces 99 and 100 of the guide rail 91 and the roller in the support 102 is disposed so as to roll along the horizontal surface 98 of the guide rail 90. The construction of the rails 90 and 91 and the manner in which the rollers are supported for movement therealong help to retain the housing 9 in the position on the rollers without slipping off.

As noted in FIGS. 3 and 5 of the drawings, the supports 101 for the rollers arranged as illustrated at 103 are spaced along the plate 101′ which is in turn secured to the nether side of the housing 9 and the supports 102 for the rollers as illustrated at 104 are also mounted in spaced relation along the other side of the plate 101′ on housing 9.

In using the method of the present invention the roll of photosensitive material 22 is placed on the supports 23 and 24 in the housing 9, care being taken to perform such operation in a darkened area so as to not expose the photosensitive or light sensitive material 22. The end of the roll of material is engaged with the reel 28 and the crank 26 then actuated a few turns so that the photosensitive material 22 is firmly engaged on the reel 28 so that it can be stepwise moved as exposures of the seismograms or seismograph records are made thereon. As previously mentioned, each seismogram is provided with a reference mark, which reference mark relates the seismograms to each other. When the micro-film 5′ is placed in the enlarger 7 so that the images from the micro-film are thereafter projected downwardly onto the photosensitive material, it can be appreciated that the seismogram records may require adjusting so as to properly align their reference marks prior to the time that their images are exposed on the photosensitive material 22. In practicing the invention, the image of the first seismogram record 2 is reflected onto the housing 9 with the aperture cover 40 closed. In a darkened room the image will be clearly visible on the cover 40 and the reference mark of the image is marked on the aperture cover 40 on the upper surface thereof. Thereafter the enlarger is turned off and the aperture cover 40 then may be opened and thereafter the enlarger turned on and left on a predetermined time by means of the timer 106 so that the image of the first seismogram is made on the photosensitive material 22. After the exposure has been completed a mark is made on the photosensitive material adjacent the edge 43 of the aperture. Thereafter the crank 26 is rotated so that the photosensitive material is moved from the supply reel 27 onto the exposed reel 28, and the photosensitive material is rotated until the mark along edge 43 of the paper thereafter appears adjacent the edge 33 of the aperture. Such rotation of the photosensitive paper may be carried out in a semi-darkened room, or under conditions which do not effect the photosensitive material or paper 22. Thereafter the aperture cover 40 is closed and the next seismogram image is reflected onto the top thereof and the reference mark on such seismogram is lined up with the reference mark on the cover 40 of the housing 9 which mark was obtained from the first seismogram. In order to align the image from enlarger 7 with the reference mark on the cover 40, the housing 9 may be moved along guide rails 90, 91 and may also be moved at either end, or both ends by reason of cranks 76 and 77.

The clamp 120 is secured to plate 101′ and fits about rail 91. The clamp is actuated by the nut 121 which either tightens the clamp on rail 91 or releases from engagement with rail 91. The clamp 120 prevents shifting of housing 9 on rails 90 and 91 after it has been adjusted therealong to a desired position. Also, the clamp 120 permits minute adjustments of the housing 9 along the rails 90 and 91. For example, the member 122 is secured to plate 101′ and is provided with a threaded opening. A bolt 123 is supported in bracket 124 which bracket is carried on clamp 120. The bolt 123 is threadedly engaged with the opening in member 122 so that when bolt 123 is rotated in bracket 124, movement of housing 9 along the rails 90 and 91 is effected if the clamp 120 is locked on rail 91. After this adjusting of housing 9 has been accomplished, the enlarger is turned off. The aperture cover may be opened and an exposure of the image of such seismogram or such seismograph record can then be made on the photosensitive material 22 by turning on the enlarger 7. Each seismogram or seismograph record is in a similar manner aligned with the initial reference mark on the cover 40 by aligning the reference mark on the seismogram or seismograph record with the initial reference mark on the cover and its image is thereafter exposed on the photosensitive material. The seismograms are exposed in sequence relating to the location of the shot points, and are arranged in side by side relation, since the material 22 is moved after each exposure. Thus, the photosensitive material will have a plurality of seismograms or seismograph records thereon as illustrated at 13a, 13b and 13c. These seismograms will be in side by side relation, and by reason of the initial reference mark on the first seismogram, and by reason of the reference mark on all subsequent seismograms which are aligned relative to this first reference mark, the seismograms will be related to each other.

It can be appreciated that as each seismogram or as each seismograph record is reflected onto the top as the aperture cover 40, it may be necessary to adjust the roll of material 22 so that the reference mark on the seismogram coincides with the initial reference mark made on the aperture cover. To accomplish such adjustment, the housing 9 may be moved by reason of the crank means 76 and 77 in a manner as previously described herein, and it may manually be moved longitudinally of the table 54 and platform 50 by reason of the roller arrangement 103 and 104 on the guide rail 91 and 90 respectively. Thus, the housing and the unexposed paper carried thereby can be adjusted relative to the image on the aperture cover 40 which is reflected from the enlarger so that the reference mark on each of the seismogram records on the film 5' may be properly aligned relative to the reference mark initially made on the aperture cover from the first seismogram. Thereafter the exposure of the image of the seismogram may be effected on the paper 22. After all of the seismograms of the area of the earth have been thus exposed on the material 22, the roll of paper is cut along the edge 43 and thereafter developed.

The present method provides an arrangement whereby the photosensitive material or paper 22 may be adjusted and positioned without any danger of exposure. After each of the seismograms first have been properly aligned relative to the initial reference mark obtained from the initial seismogram as indicated by the reference mark on the top of the aperture cover 40, then the aperture cover 40 may be opened and the exposure of each seismogram is thereafter made directly on the photosensitive material. This provides a method for producing a record of a plurality of seismograms in composite form. It correlates all of the seismograms together, since they are all related by reason of the initial reference mark. Additionally, the size of the record is such that it can be easily viewed on an ordinary size table. It can be appreciated, however, that the enlargements from the enlarger camera 7 may be to any suitable size as desired.

Broadly, the present invention relates to a method whereby a plurality of records such as seismograms or seismograph records may be correlated or simultaneously viewed, and more particularly the invention relates to a method wherein a plurality of seismograph records may be positioned in side by side relation and correlated so that they can be interpreted as a view representing a sectional illustration of the earth's subsurface.

What is claimed is:

1. A method of preparing a record representing a sectional view of an area of the earth's subsurface comprising the steps of, assembling a plurality of seismograms each having a plurality of galvanometer traces photographically printed thereon, aligning the datum reference point of each seismogram with respect to the datum reference point of each adjacent seismogram, then marking a datum reference line on the adjacent seismograms, photographically reproducing the seismograms on a film, projecting the first photographically reproduced seismogram on a non-light transmitting plate with photosensitive material thereneath, adjusting the relative positions of the photographically reproduced seismogram and the plate to align a reference mark on the plate in alignment with the projected datum reference line on the first photographically reproduced seismogram, removing the plate and then projecting the aligned photographically reproduced seismogram on the photosensitive material, stepwise projecting each successive photographically reproduced seismogram on the plate and aligning the projected datum reference line on each seismogram with the reference mark on the plate, and after each projection removing the plate to expose a portion of the photosensitive material to each aligned photographically reproduced seismogram.

2. A method of preparing a record representing a sectional view of an area of the earth's subsurface comprising the steps of, assembling a plurality of seismograms each having a plurality of galvanometer traces photographically printed thereon, aligning the datum reference point of each seismogram with respect to the datum reference point of each adjacent seismogram, then marking a datum reference line on the adjacent seismograms, photographically reducing the seismograms on a film, projecting the first photographically reduced seismogram on a non-light transmitting plate with photosensitive material thereneath, adjusting the relative positions of the photographically reduced seismogram and the plate to align a reference mark on the plate in alignment with the projected datum reference line on the first photographically reduced seismogram, removing the plate and then projecting the aligned photographically reduced seismogram on the photosensitive material, stepwise projecting each successive photographically reduced seismogram on the plate and aligning the projected datum reference line on each seismogram with the reference mark on the plate, and after each projection removing the plate to expose a portion of the photosensitive material to each aligned photographically reduced seismogram.

3. A method of preparing a record representing a sectional view of an area of the earth's subsurface comprising the steps of, assembling a plurality of seismograms each having a plurality of galvanometer traces photographically printed thereon, aligning the datum reference point of each seismogram with respect to the datum reference point of each adjacent seismogram, then marking a datum reference line on the adjacent seismograms, photographically reducing the seismograms on a film, projecting the first photographically reduced seismogram on a non-light transmitting plate with photosensitive material thereneath, adjusting the relative positions of the photographically reduced seismogram and the plate to align a reference mark on the plate in alignment with the projected datum reference line on the first photographically reduced seismogram, removing the plate and then projecting and enlarging the aligned photographically reduced seismogram on the photosensitive material, stepwise projecting and enlarging each successive photographically reduced seismogram on the plate and aligning the projected datum reference line on each seismogram with the reference mark on the plate, and after each projection removing the plate to expose a portion of the photosensitive material to each aligned photographically reduced seismogram.

4. A method of preparing a record representing a sectional view of an area of the earth's subsurface comprising the steps of, assembling a plurality of seismograms each having a plurality of galvanometer traces photographically printed thereon, aligning the datum reference point of each seismogram with respect to the datum reference point of each adjacent seismogram, then marking a datum reference line on the adjacent seismograms, photographically reducing the seismograms on a film, projecting the first photographically reduced seismogram on a non-light transmitting plate with photosensitive material thereneath, adjusting the relative positions of the photographically reduced seismogram and the plate to align a reference mark on the plate in alignment with the projected datum reference line on the first photographically reduced seismogram, removing the plate and then projecting and enlarging the aligned photographically reduced seismogram on the photosensitive material, stepwise projecting and enlarging each successive photographically reduced seismogram on the plate to a common scale with said first photographically reduced seismogram and aligning the projected datum reference line on each seismogram with the reference mark on the plate, and after each projection removing the plate to expose a portion of the photosensitive material to each aligned photographically reduced seismogram.

References Cited in the file of this patent

UNITED STATES PATENTS

| | | |
|---|---|---|
| 2,018,737 | Owen | Oct. 29, 1935 |
| 2,348,411 | Petty | May 9, 1944 |
| 2,361,183 | Eddy | Oct. 24, 1944 |
| 2,486,645 | Hager | Nov. 1, 1949 |
| 2,555,631 | Bumstead | June 5, 1951 |
| 2,614,469 | Hillmer et al. | Oct. 21, 1952 |
| 2,690,696 | Ashton | Oct. 5, 1954 |
| 2,781,690 | Fillingame | Feb. 19, 1957 |
| 2,857,830 | Cohen | Oct. 29, 1958 |
| 2,861,507 | Palmer | Nov. 25, 1958 |
| 2,876,689 | Strange | Mar. 10, 1959 |
| 2,895,377 | Manning | July 21, 1959 |
| 3,007,369 | Squassoni et al. | Nov. 7, 1961 |
| 3,012,474 | Meier et al. | Dec. 12, 1961 |